Aug. 2, 1932.    H. R. BRAND    1,869,540

FOOD HANDLING MECHANISM FOR COOKING MACHINES

Filed June 27, 1929

INVENTOR
H. R. Brand
BY
ATTORNEY

Patented Aug. 2, 1932

1,869,540

UNITED STATES PATENT OFFICE

HARRY RUSSELL BRAND, OF NEW YORK, N. Y.

FOOD HANDLING MECHANISM FOR COOKING MACHINES

Application filed June 27, 1929. Serial No. 373,970.

The present invention relates to machines for cooking food and more particularly to mechanism for picking up the food either for the purpose of turning it over so that it may be cooked on both sides or for removing the food from the machine.

The present invention is an improvement on that shown in my copending application Serial No. 268,659, filed April 9, 1928. In said application, I disclose, as a specific embodiment of the invention, a machine for baking griddle cakes on an annular griddle. The cakes when baked on one side are picked up successively by a peel, turned over, and dropped back on the griddle to be baked on the other side. Another peel picks up the cakes successively after they have been baked on said other side, carries them clear of the griddle, and then turns them over and drops them upon a plate or other suitable receptacle. I have found that under certain conditions, and with certain consistencies of batter, the cake shows a tendency to slide along the griddle while the peel is being introduced thereunder, with the result that the cake is not always properly picked up by the peel and may even slide off the griddle. It is most desirable that the cake be properly positioned on the griddle for the second baking step, so that it may be picked up by the second peel after it has been completely baked and be deposited in properly centered position on a plate. Usually an order of cakes consists of several cakes and these must be deposited successively upon a plate in superposed alinement in order to present an orderly appearance.

It is an object of the present invention to overcome the difficulties described above by holding each cake against sliding as it is being picked up by the peel.

Another object of the invention is to provide means of the type described above which comes into play when the peel is being operated but which is automatically withdrawn as soon as the peel has been introduced under the cake.

Other objects and advantages of my invention will appear in the following description of a preferred embodiment, and thereafter the novelty and scope of the invention will be pointed out in the claims.

Figures 1, 2, 3:
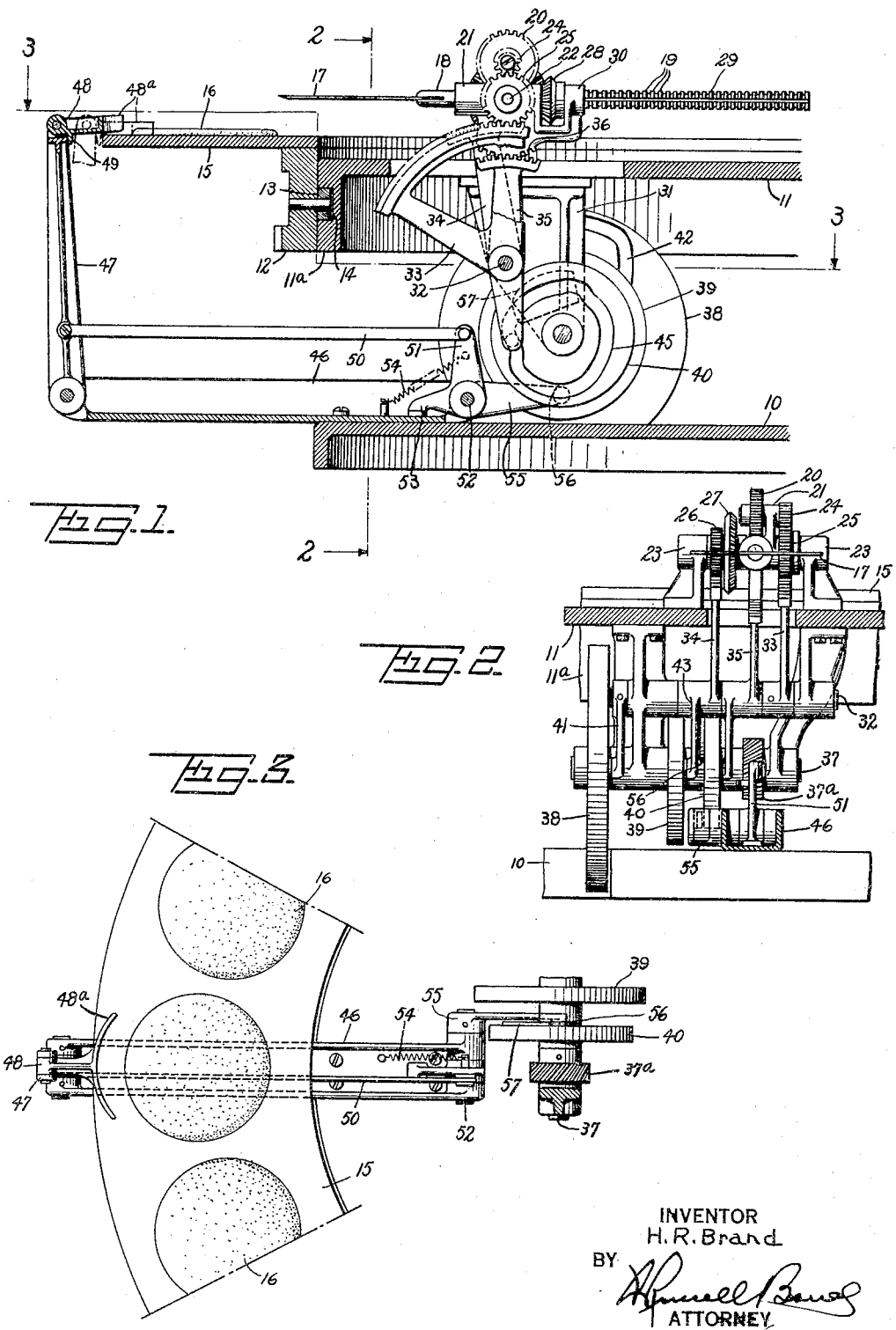
Figure 1 is a view, in vertical section, of a portion of a griddle cake baking machine embodying my improvement.
Fig. 2 is a view in transverse section taken substantially on the line 2—2 of Fig. 1.
Fig. 3 is a view in section taken substantially on the line 3—3 of Fig. 1.

In Figs. 1 and 2, I show a portion of two frame members 10 and 11, of a griddle cake baking machine. The upper frame member 11 comprises a circular web portion from which depends an annular flange 11a. This flange provides a bearing for an annular gear ring 12. The latter is provided with rollers 13 which travel in a peripheral groove 14 formed in the flange 11a. Mounted on the gear ring is an annular griddle 15 on which portions of batter are deposited and baked into cakes 16 by means of suitable burners or heating elements (not shown) under the griddle.

The griddle is rotated with a step-by-step motion by means of an intermittent driving mechanism acting on the gear ring 12. This mechanism may be of any suitable type and is not illustrated in the drawing. At each step, the griddle progresses through a space equal to the center-to-center spacing of the cakes. As successive cakes reach a predetermined point in their orbit they must be turned over so as to be baked on the opposite side. The turning of the cakes is effected automatically by a peel which is operated at each pause in the step-by-step travel of the griddle.

The peel comprises a flexible blade 17 fixed upon a stem 18. The latter is in the form of a shaft with annular peripheral teeth 19 cut therein. The teeth are engaged by a driving pinion 20. The stem 18 is adapted to turn and also to slide in a bearing member 21 which in turn is mounted to oscillate on trunnions 22 journaled in brackets 23 supported by the frame 11. The pinion 20 is also carried by the bearing member 21 and projects through a slot in said member to engage the teeth 19. A pinion 24 operatively connects the pinion 20 to a gear 25 journaled on one of the trunnions 22. Journaled on the opposite trunnion is a gear 26 to which is affixed a bevel gear 27. The latter meshes with a bevel pinion 28. The stem 18 passes through the pinion 28 and is formed with a spline groove 29 to engage a key in the pinion, so that the stem 18 will be compelled to rotate with the pinion 28, but may slide axially therethrough as it is driven by the pinion 20. The pinion 28 is held against sliding with the stem 18 by fitting it between the main body of the bearing 21 and an extension 30 of said bearing.

Journaled in brackets 31 depending from the frame member 11 is a shaft 32. Fixed upon the shaft is a toothed sector 33 which passes through an opening in the web of the frame member 11 and meshes with the gear 25. Journaled to turn freely on the shaft 32 is a toothed section 34 which meshes with the gear 26; also journaled to turn freely on the shaft 32 is a toothed sector 35 which meshes with a toothed flange 36 formed on the bearing member 18. Journaled in the brackets 31 is a cam shaft 37 on which are fixed three cams 38, 39 and 40. Fixed to one end of the shaft 32 is a depending arm 41 and the latter bears a roller which engages a groove 42 in one face of the cam 38. The sector 34 is formed with a depending arm 43 and the latter bears a roller which engages a groove in the cam 39. The sector 35 is provided with a depending arm 44 and the latter bears a roller which engages a groove 45 in the cam 40. The cam shaft 37 is provided with a pinion 37a which is adapted to be engaged by suitable driving mechanism (not shown) to rotate the cam shaft in timed rotation to the intermittent rotation of the griddle. In other words, the cam shaft makes a complete rotation for each advance of the griddle.

The cams carried by the shaft 37 are so timed that at each pause in the rotation of the griddle they will actuate the peel as follows: The cam 40, acting upon the sector 35, will rock the member 21 on its trunnion bearings, tilting the peel so that the blade 17 will come into engagement with the face of the griddle 15. Thereupon the cam 38 will actuate the sector 33 and hence the pinion 20 to feed the peel forward, so that if there is a griddle cake 16 in front of the blade it will be peeled thereby off the griddle. Then the cam 40 will again actuate the sector 35 to rock the member 21 in the opposite direction tilting the peel and the cake clear of the griddle. The cam 39 will now actuate the sector 34 to turn the peel over so as to redeposit the cake upon the griddle in inverted position. Thereafter the several cams will operate to restore the peel to its original position while the griddle advances through another step.

The mechanism as described so far is not the subject of the present invention, but has already been covered in my copending application above referred to. It will be understood that while the peel just described will operate to turn a cake over and redeposite it on the same griddle, the same kind of mechanism may be used for removing a cake from the griddle and depositing it upon an outside receptacle, the only difference being that in the latter case a longer stem 18 is provided and the cam 38 together with the intervening gearing is arranged to move the peel clear of the griddle before inverting the peel.

To prevent a cake from sliding off the griddle, while the peel is being introduced under it, I provide an abutment and means for moving the same against the cake on the side opposite that from which the peel is introduced. Such abutment and mechanism therefor is provided with each peel, that is for the peel that removes the fully baked cake from the griddle as well as for the peel which turns the half-baked cakes over on the griddle.

Secured to the base frame member 10 and projecting radially therefrom parallel to the line of travel of each peel, is a bracket or channel beam 46. Pivoted to the outer end of this beam is an upwardly extending arm 47 and pivoted to the free end of this arm is a member 48. The latter is formed with an arcuate flange 48a of a curvature approximating that of a cake 16. Projecting from the lower face of the member 48 is a lug 49 which normally bears against the arm 47 and serves as a stop to hold the member 48 in the position shown by full lines in Fig. 1. The arm 47 is adapted to be moved forward to the position shown by broken lines in Fig. 1 while the peel 17 is advancing under a cake, so that the flange 48a will bear against the periphery of the cake on the side opposite the peel and serve as an abutment to prevent the cake from sliding off the griddle.

To actuate the arm 47, I provide a connecting rod 50, which is pivotally secured at one end to the arm 47 and at the other end to an arm 51 of a bell-crank lever. This lever is fixed upon a shaft 52 which is suitably journaled in the channel beam 46. The other arm 53 of the bell-crank lever is normally pressed against the web of the channel beam 46 by a spring 54, thereby holding the lever 47 normally in the position shown by full lines in Fig. 1. Secured to the shaft 52 and extending inward adjacent the cam 40 is an arm 55 which bears a roller 56. The latter lies in position to engage a pad 57 formed on the adjacent face of the cam 40.

The shape and position of the pad 57 is such that just before the peel 17 starts to move outward to pick up the cake the pad 57 will engage the roller 57 and move the lever 47 to the position shown by broken lines in Fig. 1. The member 48 will then rest on the surface of the griddle with the abutment 48a bearing against the edge of a griddle cake on the griddle. This will prevent the cake from sliding, while the peel is advanced thereunder.

As shown in Fig. 1 the abutment is slightly beveled so that the peel will slide under the abutment. As soon as the cake has been entirely peeled off the griddle, the pad 57 will clear the roller and the abutment will snap back to the position shown by full lines in Fig. 1, under the urge of spring 54, thereby clearing the peel which is immediately lifted by the cam 40 acting on the sector 35. At the delivery point where the cake is carried by the peel beyond the griddle and before it is inverted to deposit the cake upon a suitable support, the cam groove 42 is so formed as to make a pause in the advance of the peel while the abutment is being withdrawn and the peel is being raised clear of the abutment.

While I have described a specific embodiment of my invention, I wish it to be understood that I do not limit myself to the particular construction illustrated but consider myself at liberty to make such changes in details of construction and in form and arrangement of parts as fall within the spirit and scope of the following claims.

I claim:

1. In a food cooker, a member providing a surface on which food may be cooked, a peel slidable along said surface to pick up the food thereon, an abutment movable against the food to prevent sliding thereof while the peel is introduced thereunder, and means for actuating the peel and the abutment in mutually timed relation.

2. In a cake baking machine, a griddle for baking a cake, a peel, actuating means for introducing the peel under the cake to lift the same off the griddle, and means movable to engage with the cake while the peel is being introduced thereunder to prevent the cake from sliding with respect to the griddle.

3. In a cake baking machine, a griddle for baking a cake, a peel, actuating means for introducing a peel under the cake from one side thereof, an abutment, and means operating in timed relation with said actuating means for advancing the abutment and holding the same in contact with the opposite side of the cake, while the peel is being introduced thereunder.

4. In a cake baking machine, a griddle for baking a cake, a peel, actuating means for introducing a peel under the cane from one side thereof to peel the cake off the griddle, an abutment, means operating in timed relation with said actuating means for advancing the abutment and holding the same in contact with the opposite side of the cake while the peel is being introduced thereunder, and means for withdrawing the abutment after the cake has been peeled off the griddle.

5. In a cake machine, a griddle for baking a cake, a peel, an abutment adapted to bear against the edge of the cake on one side thereof, means for advancing the peel in contact with the griddle under the cake and under the abutment, means for withdrawing the abutment, and means for raising the peel clear of the griddle, all of said means operating in mutually timed relation.

6. In a cake baking machine, a griddle for baking a plurality of cakes, a peel, driving means for progressing the griddle intermittently to bring the cakes successively into operative relation to the peel, actuating means operating at each pause in the progress of the griddle to advance the peel under a cake, and means operable in timed relation to the operation of the peel for preventing the cake from sliding while the peel is introduced thereunder.

7. In a cake baking machine, a griddle for baking a plurality of cakes, a peel, driving means for progressing the griddle intermittently to bring the cakes successively into operative relation to the peel, actuating means operating at each pause in the progress of the griddle to advance the peel under the cake, means acting in timed relation to the operation of the peel for preventing the cake from sliding during the advance of the peel, and means operating thereafter to move the cake clear of the griddle.

8. In a cake baking machine, a griddle for baking a plurality of cakes, a peel, driving means for progressing the griddle intermittently to bring the cakes successively into operative relation to the peel, actuating means operating at each pause in the progress of the griddle to advance the peel under the cake, an abutment, means operating to hold the abutment in contact with the cake during advance of the peel, means for withdrawing the abutment, and means for moving the peel clear of the griddle after the abutment has been withdrawn.

9. In a cake baking machine, a griddle for baking a plurality of cakes, a peel, driving means for progressing the griddle intermittently to bring the cakes successively into operative relation to the peel, actuating means operating at each pause in the progress of the griddle to advance the peel under a cake, a movable abutment, a spring normally holding the abutment in retracted position, and means for moving the abutment into engagement with the cake and holding the same in such engagement during advance of the peel.

10. In a cake baking machine, an annular griddle for baking a plurality of cakes, a peel movable radially outward in contact with the griddle, means for progressing the griddle step-by-step to bring the cakes successively into operative relation to the peel, means for advancing the peel during each pause in the progression of the griddle, an abutment at the outer edge of the griddle opposite the peel, means for moving the abutment radially inward into contact with the cake and for holding the abutment in such contact during advance of the peel, and a spring for retracting the abutment as soon as the cake has been peeled off the griddle.

In testimony whereof, I have signed this specification.

HARRY RUSSELL BRAND.